United States Patent
Abughalieh et al.

(10) Patent No.: US 10,615,881 B2
(45) Date of Patent: Apr. 7, 2020

(54) SYSTEM AND METHOD FOR ADAPTIVE CHANNEL EQUALIZATION IN A TIME VARYING CHANNEL

(71) Applicants: Nash'at Abughalieh, Kanata (CA); Zhuhong Zhang, Ottawa (CA)

(72) Inventors: Nash'at Abughalieh, Kanata (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/354,897

(22) Filed: Mar. 15, 2019

(65) Prior Publication Data
US 2019/0296832 A1    Sep. 26, 2019

Related U.S. Application Data

(60) Provisional application No. 62/647,261, filed on Mar. 23, 2018.

(51) Int. Cl.
*H04B 10/61* (2013.01)
*H04L 27/01* (2006.01)

(52) U.S. Cl.
CPC ..... *H04B 10/6163* (2013.01); *H04B 10/6162* (2013.01); *H04B 10/6164* (2013.01); *H04B 10/6165* (2013.01); *H04L 27/01* (2013.01)

(58) Field of Classification Search
CPC ........................................ H04B 10/6161–6163
See application file for complete search history.

(56) References Cited

U.S. PATENT DOCUMENTS

| 2003/0063664 A1* | 4/2003 | Bodenschatz ...... H03H 21/0012 375/232 |
| 2010/0287420 A1 | 11/2010 | Mathew et al. |
| 2013/0259113 A1 | 10/2013 | Kumar |
| 2014/0254655 A1* | 9/2014 | Zhong ............... H04L 27/01 375/233 |
| 2015/0010047 A1* | 1/2015 | Zhong ............. H04L 25/03057 375/233 |

FOREIGN PATENT DOCUMENTS

| CN | 106656881 A | 5/2017 |
| CN | 106982183 A | 7/2017 |

OTHER PUBLICATIONS

Ip et al.; Fiber Impairment Compensation Using Coherent Detection and Digital Signal Processing; IEEE Journal of Lightwave Technology; Feb. 15, 2010 [online], [retrieved Dec. 16, 2019]; retrieved from the Internet <URL: https://ee.stanford.edu/~jmk/pubs/impairment.comp.OFC.09.invited.for.JLT.pdf> (Year: 2010).*

* cited by examiner

*Primary Examiner* — Nathan M Cors

(57) ABSTRACT

Systems and methods are provided for adaptive equalization, for example for use with coherent optical reception. The equalizer has a loop for updating taps of an adaptive linear filter forming part of the equalizer. In the loop, an error calculator calculates an error, a gradient calculator calculates a gradient of the error or filtered error. One or more gradient filters are used to filter the gradient, and the filtered gradient is used to update the taps of the adaptive linear filter. A reduction in self oscillation in the equalizer is achieved by separating the frequencies with channel features that change with time and scaling them up to speed up convergence of the equalizer.

20 Claims, 13 Drawing Sheets

1300

| | |
|---|---|
| TC3 | Normal |
| TC6 | Normal + 6dB PDL |
| TC7 | Normal + 25k rSOP |
| TC8 | Normal + 50k rSOP |
| TC12 | Normal + 30ns/nm CD |
| TC13 | Normal + 90° iSOP + 6dB PDL + (-3G)LOFO |
| TC14 | overall penalty:iSOP(90°)+DGD(45ps)+10m fiber + PDL (4dB)+SOP(25.5KHz) |
| TC18 | overall penalty:iSOP(90°)+DGD(30ps)+10m fiber + PDL (4dB)+SOP(50.5KHz) |

1302

LMS start

| perf OSNR | 16.8 | 17.2 | 17.6 | 18 | 18.4 | 18.8 | 19.2 |
|---|---|---|---|---|---|---|---|
| TC3 | TRUE | TRUE | TRUE | TRUE | TRUE | TRUE | TRUE |
| TC6 | FALSE | TRUE | FALSE | TRUE | TRUE | TRUE | TRUE |
| TC7 | TRUE | TRUE | TRUE | TRUE | TRUE | TRUE | TRUE |
| TC8 | FALSE | FALSE | FALSE | FALSE | TRUE | FALSE | TRUE |
| TC12 | TRUE | FALSE | FALSE | TRUE | TRUE | TRUE | TRUE |
| TC13 | FALSE | FALSE | TRUE | FALSE | TRUE | TRUE | TRUE |
| TC14 | TRUE | TRUE | TRUE | TRUE | TRUE | TRUE | TRUE |
| TC18 | FALSE | FALSE | FALSE | FALSE | FALSE | TRUE | TRUE |

1304

Gradient filtering
LMS start

| perf OSNR | 16.8 | 17.2 | 17.6 | 18 | 18.4 | 18.8 | 19.2 |
|---|---|---|---|---|---|---|---|
| TC3 | TRUE | TRUE | TRUE | TRUE | TRUE | TRUE | TRUE |
| TC6 | FALSE | TRUE | TRUE | TRUE | TRUE | TRUE | TRUE |
| TC7 | TRUE | TRUE | TRUE | TRUE | TRUE | TRUE | TRUE |
| TC8 | FALSE | FALSE | TRUE | TRUE | TRUE | FALSE | TRUE |
| TC12 | FALSE | TRUE | TRUE | TRUE | TRUE | TRUE | TRUE |
| TC13 | TRUE | TRUE | TRUE | TRUE | TRUE | TRUE | TRUE |
| TC14 | TRUE | TRUE | TRUE | TRUE | TRUE | TRUE | TRUE |
| TC18 | FALSE | FALSE | FALSE | FALSE | TRUE | TRUE | TRUE |

FIG. 10

6dB PDL, 25K ROSP high OSNR
No Gradient filter

6dB PDL, 25K ROSP high OSNR
With Gradient filter

SYSTEM AND METHOD FOR ADAPTIVE CHANNEL EQUALIZATION IN A TIME VARYING CHANNEL

CROSS REFERENCE TO RELATED APPLICATION

This application claims the benefit of U.S. Provisional Patent No. 62/647,261 filed Mar. 23, 2018, which is hereby incorporated by reference in its entirety.

FIELD

The application relates to adaptive channel equalization, and more specifically to systems and methods of improving the performance of adaptive channel equalization, with a time varying channel, in the presence of probabilistic shaped constellation or large equalizer block size or high equalizer loop delay or a combination of these conditions.

BACKGROUND

Coherent optical receivers require adaptive equalizers to compensate for time-varying polarization mode dispersion effects and intersymbol interference (ISI). Probabilistic constellation shaping adds shaping gain that increases the reach of the coherent system and increases the utilization of the communication channel.

Some advances in data throughput in optical receivers rely on the processing of the received and transmitted symbols in blocks rather than serially. However, when block processing is performed, the processing delay in the channel equalizer loop is proportional to block size. The increase in loop delay in the channel equalizer reduces the convergence speed of the equalizer.

Two common types of equalization are generally used in coherent modems: blind equalization which does not require a training stage and has moderate performance, and decision directed equalization which does require a training stage and pre-compensation of frequency and timing offset at the receiver. Some coherent receiver architectures use blind equalization to improve frequency and time offset compensation during the initialization stage after which a switch is made to decision directed equalization. This yields the benefits of decision directed equalization without the need for a training stage.

The performance of the blind adaptive channel equalizers such as Constant Modulus Algorithm (CMA) equalizers deteriorates with Gaussian source signals such as signals with a probabilistic shaped QAM constellation.

An optical transmission channel can have a time varying response because of the rotation in the state of polarization (rSOP) and the polarization mode dispersion (PMD).

In the presence of a shaped constellation, the blind equalization's speed of convergence in reduces. Adding the time variation in the optical channel, blind equalizer convergence becomes challenging, especially for shaped constellations. As a result, the tracking of the channel variations with the blind equalizer needs boosting to reach a convergence state.

SUMMARY

Some embodiments of the disclosure address the problem of blindly equalizing shaped constellation in normal optical channel conditions. These embodiments are based on applying different loop gain for different frequency contents of the adaptive filter feedback. To apply different loop gain, filters are applied to the gradient signal to separate frequencies where there is more variation in the channel and then the output of these filters is added to the gradient after applying extra gain.

According to an aspect of the present disclosure, there is provided an adaptive equalizer comprising: an adaptive linear filter having a plurality of taps configured to process an input to produce an equalizer output; a plurality of components, the adaptive linear filter and the plurality of the components connected in a loop configuration to update taps of the adaptive linear filter, the plurality of functional components comprising: an error calculator configured to calculate an error using an error constraint function based on the equalizer output; a gradient calculator configured to calculate a gradient, wherein the gradient is a gradient of the error or a gradient of a filtered error with respect to taps of the adaptive linear filter; at least one gradient filter configured to perform a filtering operation on the gradient to produce a filtered gradient, wherein each gradient filter is a bandpass filter having a passband that isolates a respective frequency band of the gradient; and an overall gain adjusted filtered gradient calculator configured to apply a gain factor to the gradient to produce a gain adjusted gradient and to apply a respective gain factor to each of the corresponding filtered gradients produced by the at least one gradient filter to produce corresponding gain adjusted filtered gradients, and to sum the gain adjusted gradient and the corresponding gain adjusted filtered gradients to produce the overall gain adjusted filterer gradient; a filter tap updater configured to calculate updated taps for the adaptive linear filter phase based on the overall gain adjusted filtered gradient.

Optionally, the passbands and the gains are preselected for a particular channel such that frequency components of the channel that have relatively more time variation are given larger gains.

Optionally, the overall gain adjusted filtered gradient is: $\mu \nabla J(n) + \mu_1(h_1(k) \odot \nabla J(n)) + \mu_2(h_2(k) \odot \nabla J(n)) + \ldots + \mu_n(h_n(k) \odot \nabla J(n))$ where: $\nabla J(n)$ is the gradient of the error; $\mu$ is the gradient gain factor; $\odot$ stands for convolution operation; $\mu_1, \mu_2, \ldots \mu_n$ are gain factors of filtered gradients; and $h_1, h_2, \ldots, h_n$ are gradient filter responses.

Optionally, the adaptive equalizer is configured for application to a channel where a main source of change in time is rSOP (rotational state of polarization) and the overall gain adjusted filtered gradient is $\mu \nabla J(n) + \mu_1(h_1(n) \odot \nabla J(n))$, where: $\nabla J(n)$ is the gradient of the error; $\mu$ is the gradient gain factor; $\odot$ stands for convolution operation; $\mu_1$ is the gain factor for a single filtered gradient; $h_1$, is the gradient filter response.

Optionally, the equalizer is a blind equalizer.

Optionally, the equalizer is a decision directed equalizer.

Optionally, the adaptive equalizer comprises: N adaptive linear filters inclusive of said adaptive linear filter to process a block of N symbols; wherein the error calculator calculates N errors including a respective error for each of the N symbols; wherein the gradient calculator calculates a respective one of N gradients for each of the N errors; the adaptive equalizer comprising N*M gradient filters inclusive of said at least one gradient filter, each group of M filters configured to perform a filtering operation on a respective one of the N gradients to produce a respective filtered gradient; the filter tap updater is configured to calculate updated taps for each of the N adaptive linear filters based on a respective one of the N filtered gradients.

Optionally, the error calculator and the gradient calculator are combined.

According to another aspect of the present disclosure, there is provided a coherent receiver comprising: a receiver for receiving a signal over a channel; an analog to digital to converter; a front end digital to signal processor; an adaptive equalizer comprising: an adaptive linear filter having a plurality of taps configured to process an input to produce an equalizer output; a plurality of components, the adaptive linear filter and the plurality of the components connected in a loop configuration to update taps of the adaptive linear filter, the plurality of functional components comprising: an error calculator configured to calculate an error using an error constraint function based on the equalizer output; a gradient calculator configured to calculate a gradient, wherein the gradient is a gradient of the error or a gradient of a filtered error with respect to taps of the adaptive linear filter; at least one gradient filter configured to perform a filtering operation on the gradient to produce a filtered gradient, wherein each gradient filter is a bandpass filter having a passband that isolates a respective frequency band of the gradient; and an overall gain adjusted filtered gradient calculator configured to apply a gain factor to the gradient to produce a gain adjusted gradient and to apply a respective gain factor to each of the corresponding filtered gradients produced by the at least one gradient filter to produce corresponding gain adjusted filtered gradients, and to sum the gain adjusted gradient and the corresponding gain adjusted filtered gradients to produce the overall gain adjusted filterer gradient; a filter tap updater configured to calculate updated taps for the adaptive linear filter phase based on the overall gain adjusted filtered gradient.

Optionally, the coherent receiver is a coherent optical receiver.

Optionally, the at least one gradient filter produces an output according to: $\mu \nabla J(n) + \mu_1 (h_1(k) \odot \nabla J(n)) + \mu_2 (h_2(k) \odot \nabla J(n)) + \ldots + \mu_n (h_n(k) \odot \nabla J(n))$ where: $\nabla J(n)$ is the gradient of the error; $\mu$ is the gradient gain factor; $\odot$ stands for convolution operation; $\mu_1, \mu_2, \ldots \mu_n$ are gain factors of filtered gradients; and $h_1, h_2, \ldots, h_n$ are gradient filter responses.

Optionally, the coherent receiver is configured for application to a channel where a main source of change in time is rSOP (rotational state of polarization) and the overall gain adjusted filtered gradient is $\mu \nabla J(n) + \mu_1 (h_1(n) \odot \nabla J(n))$, where: $\nabla J(n)$ is the gradient of the error; $\mu$ is the gradient gain factor; $\odot$ stands for convolution operation; $\mu_1$ is the gain factor for a single filtered gradient; $h_1$, is the gradient filter response.

According to another aspect of the present disclosure, there is provided a method of adaptive equalization, the method comprising: processing an input with an adaptive linear filter having a plurality of taps to produce an equalizer output; calculating at least one error using an error constraint function based on the equalizer output; calculating at least one gradient, wherein each of the at least one gradient is a gradient of a respective one of the at least one error or a gradient of a respective filtered one of the at least one error with respect to taps of the adaptive linear filter; filtering the at least one gradient to produce at least one filtered gradient; and updating taps for the adaptive linear filter phase based on the at least one filtered gradient; wherein said filtering the at least one gradient filter is configured to improve adaptive filter convergence at specific frequencies that suffer from more time variations by filtering the specific frequencies and giving them higher loop gain than other frequencies.

Optionally, filtering the at least one gradient produces an output according to: $\mu \nabla J(n) + \mu_1 (h_1(k) \odot \nabla J(n)) + \mu_2 (h_2(k) \odot \nabla J(n)) + \ldots + \mu_n (h_n(k) \odot \nabla J(n))$ where $\nabla J(n)$ is the gradient of the error; $\mu$ is the gradient gain factor; $\odot$ stands for convolution operation; $\mu_1, \mu_2, \ldots \mu_n$ are gain factors of filtered gradients; and $h_1, h_2, \ldots, h_n$ are gradient filter responses.

Optionally, the method is configured for application to a channel where a main source of change in time is rSOP (rotational state of polarization) and the overall gain adjusted filtered gradient is $\mu \nabla J(n) + \mu_1 (h_1(n) \odot \nabla J(n))$, where: $\nabla J(n)$ is the gradient of the error; $\mu$ is the gradient gain factor; $\odot$ stands for convolution operation; $\mu_1$ is the gain factor for a single filtered gradient; $h_1$, is the gradient filter response.

Optionally, said adaptive equalization is blind equalization.

Optionally, said adaptive equalization is decision directed equalization.

Optionally, the method is performed blockwise to process a block of N symbols with N adaptive linear filters inclusive of said adaptive linear filter.

According to another aspect of the present disclosure, there is provided a method of performing coherent reception comprising: receiving a signal over a channel; performing analog to digital conversion and front end digital signal processing performing adaptive equalization using the method as described herein.

Optionally, receiving a signal over a channel comprises receiving an optical signal over an optical channel.

According to one aspect of the present disclosure, there is provided an adaptive equalizer comprising: an adaptive linear filter having a plurality of taps configured to process an input to produce an equalizer output; a plurality of functional components, the adaptive linear filter and the plurality of the functional components connected in a loop configuration to update taps of the adaptive linear filter; the plurality of functional components including a linear phase high-pass filter configured to attenuate a low-frequency tone in the loop.

Optionally, the plurality of functional components comprise: an error calculator configured to calculate an error using an error constraint function based on the equalizer output; a gradient calculator configured to calculate a gradient of the error with respect to taps of the adaptive linear filter; a linear phase filter configured to perform a high pass filtering operation on the gradient to produce a filtered gradient; a filter tap updater configured to calculate updated taps for the adaptive linear filter phase based on the filtered gradient.

Optionally, the plurality of functional components comprise: an error calculator configured to calculate an error using an error constraint function; a linear phase filter configured to perform a high pass filtering operation on the error to produce a filtered error; a gradient calculator configured to calculate a gradient of the filtered error with respect to taps of the adaptive linear filter; a filter tap updater configured to calculate updated taps for the adaptive linear filter based on the filtered gradient.

Optionally, the equalizer is a blind equalizer.

Optionally, the equalizer is a decision directed equalizer.

Optionally, the adaptive equalizer comprises N adaptive linear filters inclusive of said adaptive linear filter to process a block of N symbols; wherein the error calculator calculates N errors including a respective error for each of the N symbols; wherein the gradient calculator calculates a respective one of N gradients for each of the N errors; the adaptive equalizer comprising N linear phase filters inclusive of said linear phase filter, each linear phase filter configured to perform a high pass filtering operation on a respective one of the N gradients to produce a respective filtered gradient; the filter tap updater is configured to calculate updated taps for each of the N adaptive linear filters based on a respective one of the N filtered gradients.

Optionally, the error calculator and the gradient calculator are combined.

According to another aspect of the present disclosure, there is provided a coherent receiver comprising the adaptive equalizer as described herein.

Optionally, the coherent receiver is a coherent optical receiver.

According to another aspect of the present disclosure, there is provided a method of equalizing comprising: filtering an input with an adaptive linear filter having a plurality of taps to produce an equalizer output; executing a feedback loop to adaptively update the taps of the adaptive linear filter; performing the feedback loop comprising performing linear phase high-pass filtering to attenuate a low-frequency tone in the loop.

Optionally, executing a feedback loop comprises: calculating an error using an error constraint function based on the equalizer output; calculating a gradient of the error with respect to taps of the adaptive linear filter; performing said high pass filtering operation on the gradient to produce a filtered gradient; calculating updated taps for the adaptive linear filter phase based on the filtered gradient.

Optionally, executing the feedback loop comprises: calculating an error using an error constraint function; performing said high pass filtering operation on the error to produce a filtered error; calculating a gradient of the filtered error with respect to taps of the adaptive linear filter; calculating updated taps for the adaptive linear filter based on the filtered gradient.

Optionally, the equalizing is blind equalizing.

Optionally, the equalizing is decision directed equalizing.

Optionally, the method comprises: processing a block of N symbols with N adaptive linear filters inclusive of said adaptive linear filter to process a block of N symbols; calculating a respective error for each of the N symbols; calculating a respective one of N gradients for each of the N errors; performing a respective a high pass filtering operation on each one of the N gradients to produce a respective filtered gradient; calculating updated taps for each of the N adaptive linear filters based on a respective one of the N filtered gradients.

Optionally, error calculating and gradient calculating are combined.

BRIEF DESCRIPTION OF THE DRAWINGS

Embodiments of the disclosure will now be described with reference to the attached drawings in which:

FIG. 10 contains three tables that summarize various optical communication simulation results with different channel conditions;

DETAILED DESCRIPTION

Figure 1:
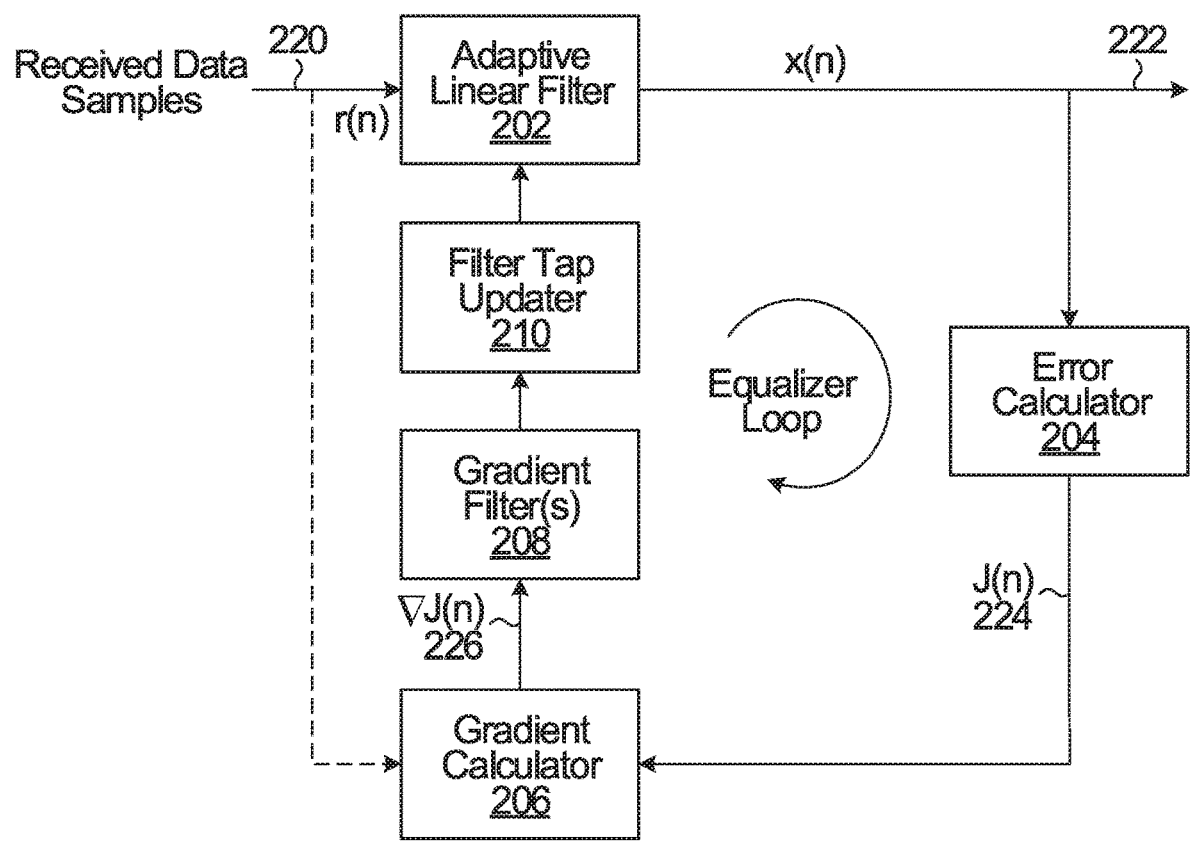
FIG. 1 is a block diagram of an equalizer with loop delay compensation provided by an embodiment of the disclosure.

As noted above, blind equalization can be used to eliminate the need for a training stage. Constellation shaping can be employed to add shaping gain to enable improved utilization of the available channel.

In the presence of a shaped constellation with high delay in the blind equalizer loop (because of the block processing in the receiver), the equalizer becomes unable to track channel impairments.

Some channel equalizers run gradient descent algorithms in which the equalizer coefficients are updated with the gradient of the error function, multiplied by the step size. Where block processing is performed, the gradient descent algorithm is performed after every N received symbols, where N is the block size. The larger N is, the larger the delay in the channel equalization loop.

Increasing the delay in the channel equalization loop causes self-oscillations in the filter output which degrades the convergence level and speed. More specifically, the channel equalization loop introduces a tone at a frequency correlated with the inverse of the loop delay when the step size is high. This tone is created when the equalizer loop runs at the edge of a stable region, a few steps from instability. The high step size is used in the equalizer to track channel impairment changes with time, for example the rotation state of polarization in polarized optical communication.

In some channel equalizers running gradient decent algorithms, the equalizer coefficients are updated with the derivative of the constraint function with respect to input, multiplied with the step size according to $$W(n+1)=W(n)+\mu \nabla J(x(n-T))$$

where W is the filter coefficients, x(n) is the filter output, T is the delay in the filter loop and $\mu$ is the step size. Increasing the constellation shaping rate will decrease equalizer convergence speed, in particular for blind channel equalization.

Increasing μ will increase the adaptation speed of the equalizer, which is a key factor for a time varying channel such as an optical fiber. But increasing μ will also increase the instability in the equalizer. In the presence of constellation shaping with rotation in the state of polarization (rSOP), using blind equalization is not feasible.

Some embodiments of the disclosure address the problem of self-oscillations in the adaptive channels equalizers that is caused by the increased delay in the equalizer loop, and some embodiments adjust equalizer loop gain to improve equalizer convergence in the presence of a time varying polarization mode dispersion (PMD) channel.

Some embodiments of the disclosure address the problem of blindly equalizing shaped constellation in normal optical channel conditions. These embodiments are based on applying different loop gain for different frequency contents of the adaptive filter feedback. To apply different loop gain, filters are applied to the gradient signal to separate frequencies where there is more variation in the channel and then the output of these filters is added to the gradient after applying extra gain.

FIG. 1 is a block diagram of an equalizer with loop delay compensation provided by an embodiment of the disclosure. The loop includes an adaptive linear filter 202, error calculator 204, gradient calculator 206, gradient filter(s) 208, and filter tap updater 210 connected in a loop configuration.

In operation, an input 220 to the equalizer loop is input to the adaptive linear filter 202 which outputs equalized data samples 222. The error calculator 204 processes the equalized data samples 222 to produce error samples at 224. A gradient operation is applied to the error samples 224 in the gradient calculator 206 to produce an error gradient 226. The error gradient 226 is filtered in gradient filter(s) 208 to produce a filtered error gradient 228. The filtered error gradient 228 is input to the adaptive filter tap updater 210 which determines updated taps 230 for the adaptive filter 102.

In some embodiments, the gradient filter 208 is a linear phase filter. A filter with linear phase is a filter that has the same delay for all frequencies. A specific example of a linear phase filter is a finite impulse response (FIR) filter. In some embodiments, the goal of filter 208 is to attenuate the self-oscillation tone in the feedback loop by a few dBs which will be enough to substantially eliminate this tone from the output of the loop. The reduction in the self-oscillation is achieved by applying the gradient filter 208, in the form of a linear phase filer, on the error gradient 226.

In another embodiment, the gradient filters 208 are not necessarily linear phase filters, and the reduction in the self-oscillation is achieved by reducing loop gain while applying the gradient filters 208 on the error gradient 226 to separate the frequencies with channel features that change with time and scale the loop gain for these frequencies up to speed up convergence of the equalizer. For this embodiment ideally, the gradient filters 208 should also have the following characteristics:
- low delay to minimize added delay into the equalizer loop by the new function;
- stabilizing the equalizer and improving convergence speed.

In some embodiments, blockwise processing is performed in one or more of the blocks in the equalization loop. The structure is similar to FIG. 1, but with multiple parallel processing operations in one or more of the blocks. In a specific example, the equalization loop includes a block adaptive linear filter to process a block of N symbols. The error calculator calculates N errors including a respective error for each of the N symbols. The gradient calculator calculates a respective one of N gradients for each of the N errors. There are N linear phase filters. Each feedback filter is configured to perform filtering operation on a respective one of the N gradients to produce a respective filtered gradient. The adaptive filter tap updater is configured to calculate updated taps for each of the N adaptive linear filters based on a respective one of the N filtered gradients.

A specific example detailed implementation of the equalizer loop of FIG. 1 will now be described. The input r(n) 220 of the equalizer loop can be the received symbols or samples. The input r(n) is fed to adaptive linear filter 202. The adaptive linear filter 202 can be implemented in time or frequency domains. The adaptive linear filter 202 may process input symbols serially or in blocks. The adaptive linear filter 202 has adaptive taps which are updated by the filter tap updater 210. The output of the adaptive linear filter 202 is the convolution of the input symbols or samples with the filter taps according to $$x(n) = \sum_{l=0}^{L} w(l, n) r(n - l)$$

where $w(l, n)=[w(0, n), w(1, n), \ldots, w(L, n)]^T$ are the adaptive taps of the filter and L is the length of the filter and n notation for adaptability over time of the filter taps. The convolution between the input symbols or samples and the filter taps can be written as $x(n)=r(n) \circledast w(l, n)$.

The output of the filter 202 is fed to the error calculation block 204 to calculate the error in the filter output according to an error constraint function. In some embodiments, the error constraint function depends on the decisions on the recovered symbols. An equalizer using such a constraint function is referred to as a decision directed equalizer. A least mean square (LMS) equalizer is a specific example of a decision directed equalizer. In some embodiments, other error constraint functions that do not depend on the knowledge of the received symbols are used, and such equalizers are called blind equalizers. A constant modulus algorithm (CMA) equalizer is a specific example of a blind equalizer. Taking CMA as an example here, the error constraint function can be $J(n)=(|x(n)|^2-R^2)^2$ where R is a constant. The input of the error calculator 204 is the adaptive filter output x(n) and the output of the error calculator is J(n). In some embodiments, the output of the error calculator 204 can be modified to serve the function of the gradient error calculation 206. In the current example, the error constraint is $J(n)=(|x(n)|^2-R^2)^2$, while the gradient calculator does not include squaring of the error. In some embodiments, the gradient calculator may square the error, and in this case the error function block 204 may calculate $(|x(n)|^2-R^2)$ for use in the gradient calculator.

The gradient is the derivative of the error constraint function with respect to the taps of the linear filter 202. The error $(|x(n)|^2-R^2)$ is the output 205 from error calculation block 204, x(n) is the output 222 from the adaptive filter 202 and is also the output of the equalizer. r(n) is the input to the adaptive filter. Of course, the gradient calculation is different for different constraint functions. The error calculation block 204 and the gradient calculation block 206 can be merged in other embodiments.

The delay in the filtering process and error calculation process can be modeled as T. So the output of the gradient calculator 206 is a delayed gradient of error that belongs to input r(n−T). To include this delay in the output of the gradient calculation block, it can be written as $\nabla J(n)=2r(n-T)x(n-T)(|x(n-T)|^2-R^2)$.

In some embodiments, where a linear phase filter is used, the output of the gradient calculator 206 is filtered with the linear phase filter in 208 to eliminate the ripples in the signal (the self-generated tone in the equalizer). In some embodiments, the linear phase filter is an FIR filter having impulse response h(k) of length K; $h(k)=[h(0), h(1), \ldots, h(K)]^T$. The output of the linear phase filter 208 is the convolution between $\nabla J(n)$ and $h(k) \nabla J(n) \nabla J \odot h(k) = \Sigma_{k=1}^{K} \nabla J(n-k)*h(k)$.

In other embodiments, the output of the gradient calculator 206 is filtered with filters in 208 to separate frequencies that correspond to channel frequency components that have fast variations. For example in an optical channel, the rotation in the state of the polarization (rSOP) is a dynamically changing parameter of the channel. Other channel impairments like polarization mode dispersion PMD will change because of rSOP. This is due to the fact that rSOP has low frequency compared to baud rates of coherent optical receivers, the gradient low frequencies will change with time. Increasing the gradient gain to track this change can cause instability in the equalizer. The gradient filter can overcome this problem by using a low pass filter as the gradient filter to isolate the frequency components of the gradient that change with time with rSOP, and then increase the loop gain for the gradient filter output and add it to the gradient signal. If there are different sources of channel variation with time that have different frequencies, then different gradient filters are used to isolate and amplify the gain of these different frequencies. The filters' outputs are attenuated (or amplified) with given gain for each before adding back to the gradient to speed up convergence. In some embodiments, the filters 208 are FIR or IIR filters having impulse response $h_i(n)$; for $i=1, 2, 3, \ldots, n$ where n is the number of filters per gradient element in the gradient vector. The output of the filters in 208 is added to the gradient after applying gain or attenuation to each filter output it. The output of 208 is $\mu \nabla J(n) + \mu_1(h_1(n) \odot \nabla J(n)) + \mu_2(h_2(n) \odot \nabla J(n)) + \ldots + \mu_n(h_n(n) \odot \nabla J(n))$ Where $\odot$ stands for convolution operation, $\mu_1, \mu_2, \ldots \mu_n$ are the gain factors multiplied by the output of filters $h_1, h_2, \ldots, h_n$. $\mu$ is the gain of the un-filtered gradient. For example, if rSOP is the main source of change in time in the dynamic channel response, then one low pass filter, like alpha IIR low pass filter, can be used as $h_1(n)=\alpha(1-\alpha)^{-n}u(n)$ where $0<\alpha<1$. The output of 208 will be $\mu \nabla J(n)+\mu_1(h_1(n) \odot \nabla J(n))$ where $\mu_1>0$. If $\mu_1=\mu$ then the adaptation to the rSOP is doubled compared to non-gradient filtered adaptive filter.

The output of the gradient filter is then used to update the taps of the adaptive filter according to the following equation:

$$w(l,n+1)=w(l,n)+\mu h(n) \odot \nabla J(r(n-l-T),x(n-T))$$

where $\mu$ is the step size.

More generally, the error can be expressed as $$\text{Error}=E\{|x|^2-R^2\}$$

and the gradient of the error can be expressed as $$\text{gradient(Error)} = \nabla_{w^H} E[|x|^2 - R^2] =$$
$$(|x|^2 - R^2)x\nabla_{w^H}(x^H) = (|x|^2 - R^2)x\nabla_{w^H}(w^H r^H) = (|x|^2 - R^2)xr^H$$

where $(\cdot)^H$ represents conjugation.

If the equalizer is running in blocks, then at each clock cycle or at each valid input, the adaptive linear filter 202 receives a block $R(N,n)=[r(0, n), r(1, n), r(N-1, n)]^T$ which has N number of samples or symbols at time n. The adaptive filter processes the N samples or symbols in parallel. Each sample is filtered in a filter having taps in a respective row of a tap matrix W(N,L,n). The output of the adaptive filter will be $X(N,n)=W(N,L,n)^T R(N,n)$.

The output of blocks 204 and 206 are J(N,n) and $\nabla J(N,n)$ respectively. The gradient filter 208 filters the output of the gradient calculator 206 with respect to time. The gradient filter 208 is composed of M filters for each element in the gradient vector. The first M filters group is fed with gradient $\nabla J(1,n)$; the second M filters group is fed with $\nabla J(2, n)$ and so on. The filters will separate frequency components of the gradient that have faster changes in time and amplify the loop gain for these components. The output of the gradient filter 208 can be expressed as $\Sigma_{i=0}^{M} \mu_i h_i(n) \odot ((r(N,n-T)x(N,n-T)(|x(N,n-T)|^2-R^2))$ for a blind adaptive filter relation, where r(t−T) is the delayed adaptive filter input with loop delay T, and x(n) is the filter output and $h_0(n)=1$. The vector at the output of 208 again contains a number N of values at time n, which is the convolution between filters' impulse response in 208 and the output of the gradient calculator 206.

The taps of the adaptive filter 202 are updated in the filter tap updater 210. The number of adaptive filter taps can be equal to the symbol block length N or can be a different number. In some embodiments, the adaptive filter may be working at a sample rate while error calculation block may work at a symbol rate. In a specific example, the filter taps are updated using an accumulation function that accumulates the value of the taps with the output of the linear filter 208 according to:

$$W(N,l,n+1)=W(N,l,n)+\mu h(k)*\nabla J(R(N,n-l-T),X(N,n-T)),$$

The block size defines the number of filters operating in parallel, and is the same as the size of gradient block length. However, in some embodiments, as mentioned in the previous paragraph, the adaptive filter may work on samples while error calculation and gradient calculation may work on symbols. Upsampling and/or downsampling may be employed in such approaches, such operations being implemented in the equalizer loop to change the length of the block from one stage to another.

Figure 2A:
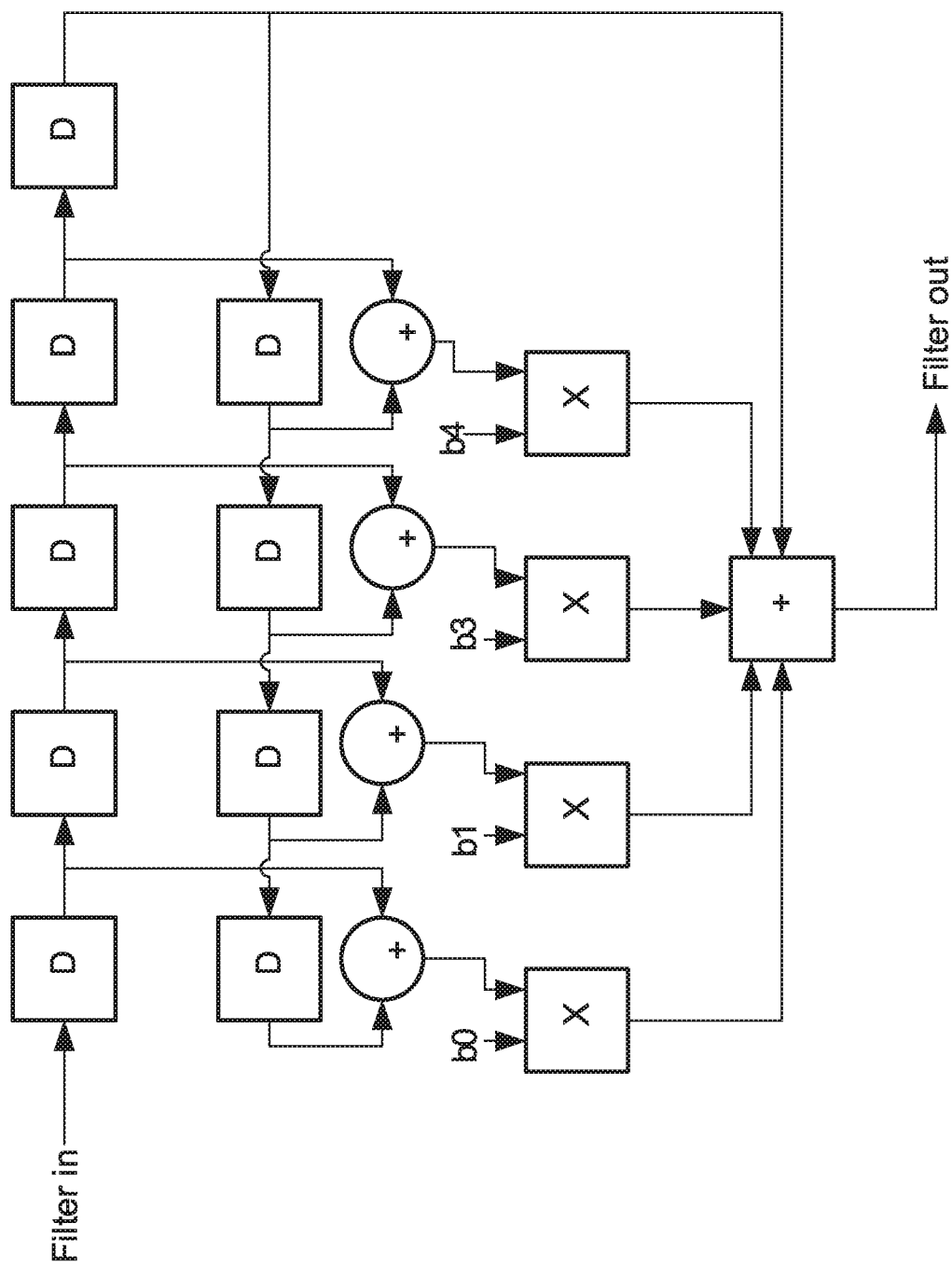
FIG. 2A is a block diagram of an example circuit implementation of a linear phase filter used to filter the error gradient.

FIG. 2A is a block diagram of an example circuit implementation of a linear phase filter 208 may be used to filter the gradient. The input to the filter is the gradient of the error, and the output is the filtered gradient. For the example of FIG. 2A, the impulse response is h(k)=[b0 b1 b3 b4 1 b4 b3 b1 b0]. This circuit is a minimized implementation made possible because the impulse response is symmetric (because it is a linear filter) and normalized (center point is 1, no multiplier). Specifically, the circuit of FIG. 2A is a low latency implementation of a 9 tap FIR filter. Other implementations of a linear phase filter are possible as would be understood to the person skilled in the art.

Figure 2B:
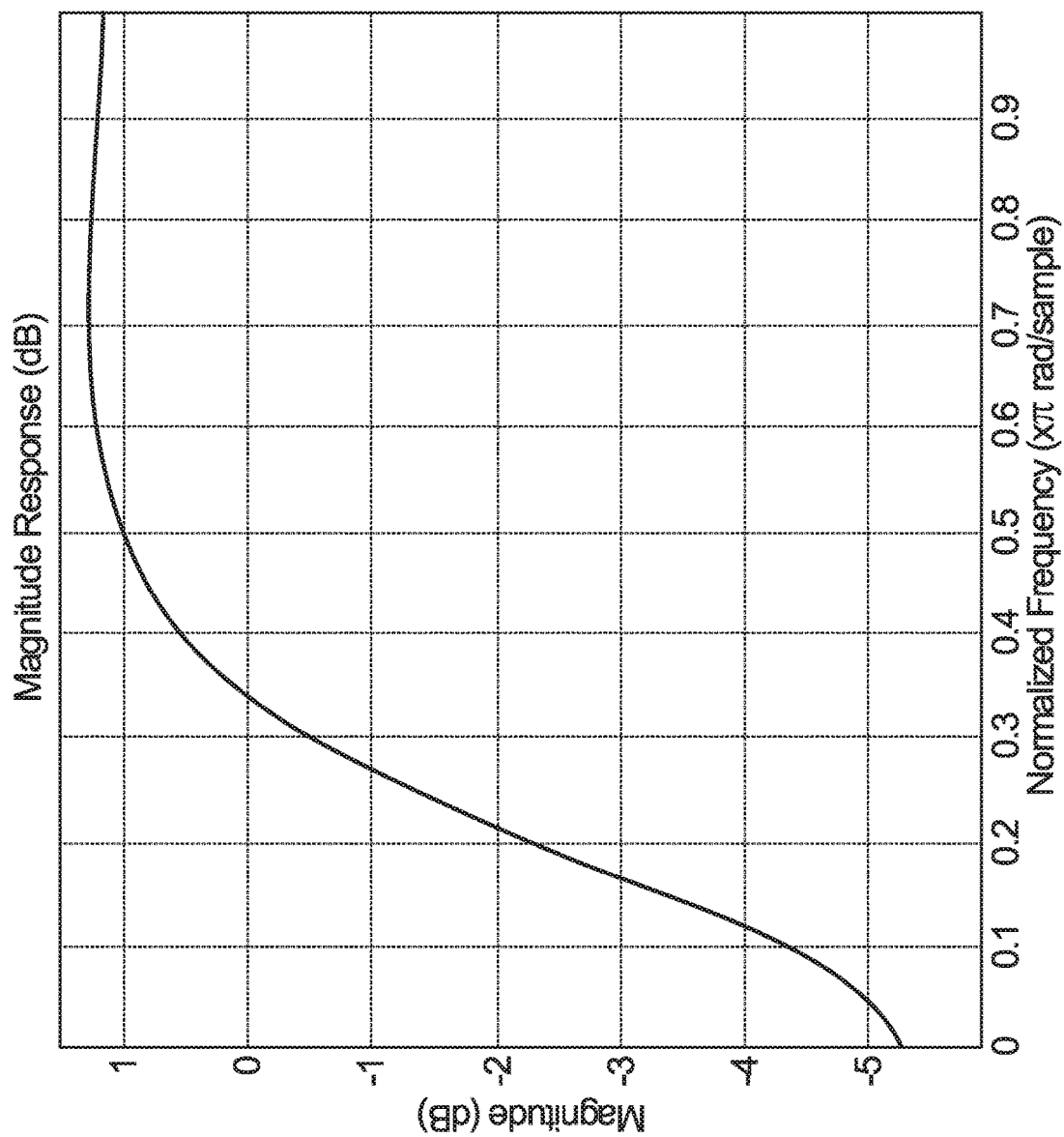
FIG. 2B depicts an example highpass filter response, produced by the filter of FIG. 2A, suitable for use in the linear phase filter to filter the gradient of the error.

FIG. 2B depicts an example highpass filter response, produced by the filter of FIG. 2A, suitable for use in the linear phase filter 208 to filter the gradient of the error. The pass band includes frequencies of interest, but does not include frequencies of the added low frequency tone. The x-axis is the frequency normalized to the baud rate/samples block size. The y-axis is the gain of the filter in dB. The filter has a high pass response. The self-generated oscillation in the adaptive equalizer starts appearing when the delay in the loop is high. The oscillation period is a function of the delay in the equalizer loop. The oscillations that have high amplitude and can affect the performance of the equalizer always have much lower frequency than the baud rate, hence the need for a high pass filter.

In another embodiment, the gradient filtering is an accordance with:

$$w(n+1)=w(n)+\mu(\nabla J(x(n-T)))+\mu_1 h_1(\nabla J(x(n-T)))+\mu_2 h_2(EJ(x(n-T)))+ \ldots +\mu_N h_N(\nabla J(x(n-T)))$$

where $h_k(\ )$ is the gradient filter k added to the equalizer loop which works as a filter with pass band in the channel frequency region that has higher variation with time. The added filter increases the gain of the adaptive equalizer loop at specific frequencies while keeping the general loop gain in the stable region. The added filters to the equalizer loop stabilizes the equalizer and improves convergence speed. In the above equation:

w are the adaptive filter coefficients;
x(n) is the input of the adaptive filter;
T is the delay in the filter loop and $\mu_i$ is the step size for the ith gradient filter.

Figure 3:
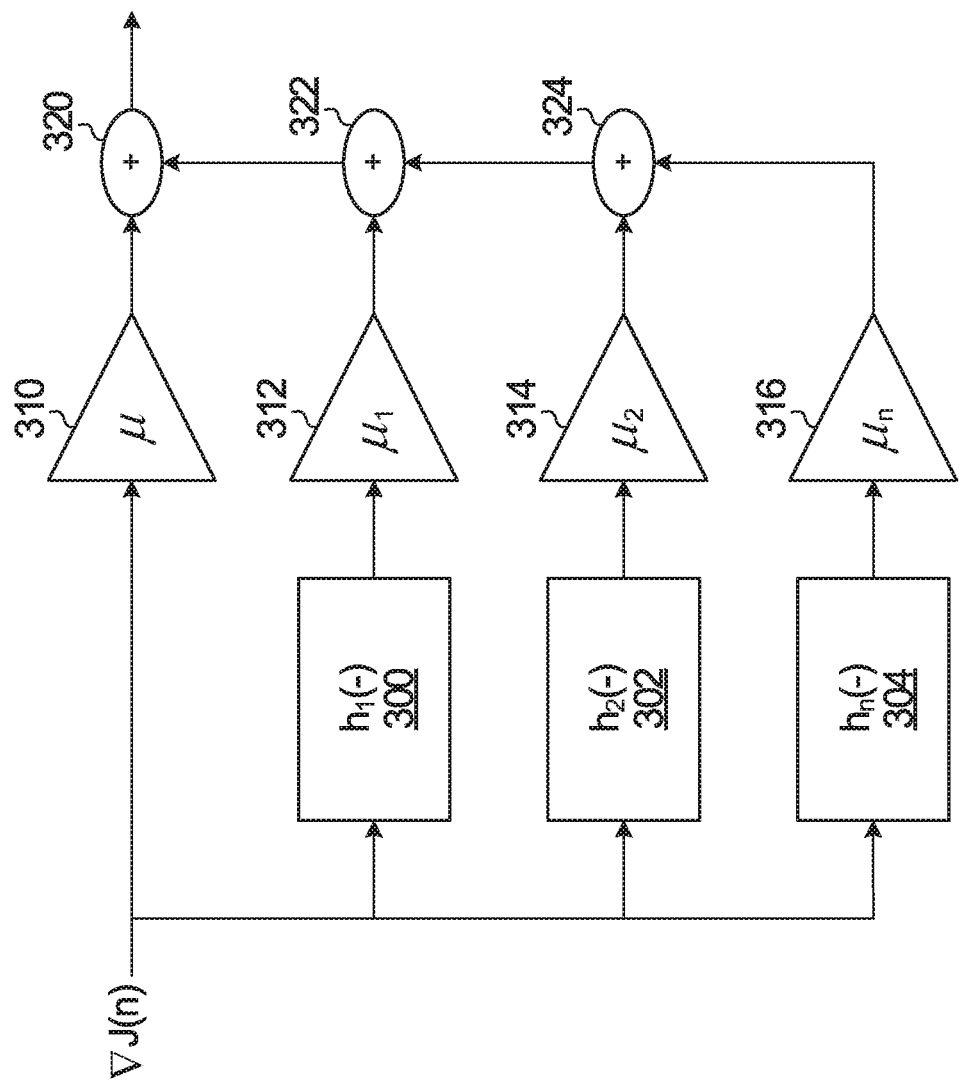
FIG. 3 is a block diagram of a gradient filter provided by an embodiment of the disclosure.

FIG. 3 shows an example implementation of the gradient filtering aspect of the above-described equalizer relation. The input to the gradient is the gradient($\nabla J(n)$). This is processed in multiple gradient filters 300, 302, . . . 304. A gain is applied to each of the gradient components, and each output of the gradient filters 300, 302, . . . , 304 in respective gain units 310, 312, 314, . . . , 316, and the output of the gain units is combined in adders 320, 322, 324 to produce the overall filtered gradient output. If the gradient vector length is N then at maximum N gradient filter instants are needed. The gradient filter in FIG. 3 is the implementation of the gradient filter relation $\Sigma_{i=0}^{M}(\mu_i h_i(n) \otimes (r(N, n-T)x(N, n-T))(|x(N, n-T)|^2 - R^2))$, where $h_0(n)=1$ and $\mu_0=\mu$.

Figure 4:
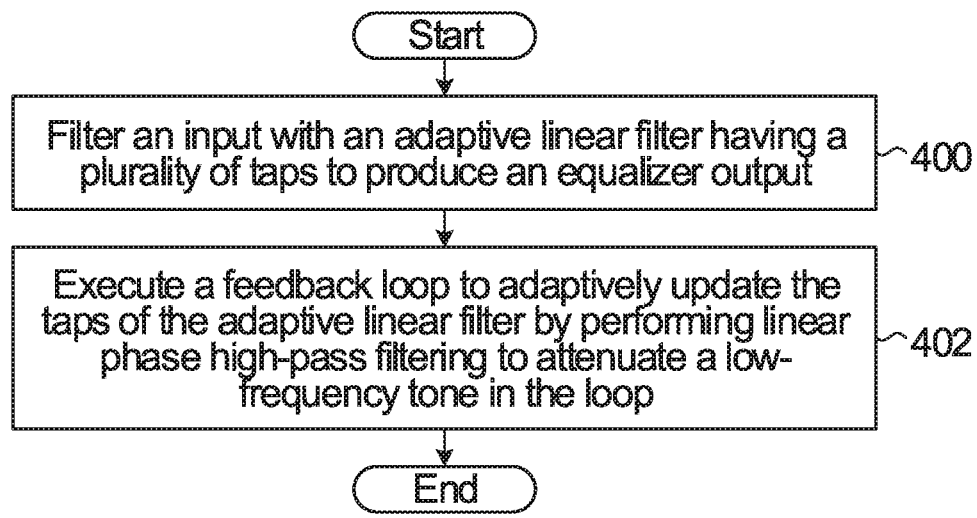
FIG. 4 is a flowchart of a method of performing adaptive equalization in accordance with an embodiment of the disclosure.

FIG. 4 is a flowchart of a method of performing adaptive equalization in accordance with an embodiment of the disclosure. The method begins with filtering an input with an adaptive linear filter having a plurality of taps to produce an equalizer output, in block 400. The method continues with executing a feedback loop to adaptively update the taps of the adaptive linear filter, in block 402. Performing the feedback loop includes performing linear phase high-pass filtering to attenuate a low-frequency tone in the loop.

Optionally, executing the feedback loop in block 402 involves calculating an error using an error constraint function based on the equalizer output, calculating a gradient of the error with respect to taps of the adaptive linear filter, performing the high pass filtering operation on the gradient to produce a filtered gradient, and calculating updated taps for the adaptive linear filter phase based on the filtered gradient.

Alternatively, optionally, executing the feedback loop in block 402 involves calculating an error using an error constraint function, performing said filtering operation on the error to produce a filtered error, calculating a gradient of the filtered error with respect to taps of the adaptive linear filter, and calculating updated taps for the adaptive linear filter based on the filtered gradient.

Figure 5:
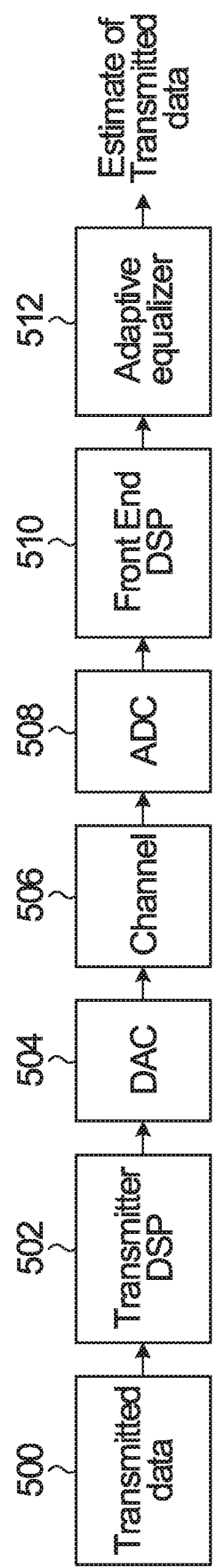
FIG. 5 is a block diagram of a coherent optical receiver in accordance with an embodiment of the disclosure.

FIG. 5 is a block diagram of a coherent optical transmission system in accordance with an embodiment of the disclosure that includes an adaptive equalizer as described above. The system includes a transmitter digital signal processor 502 that processes transmitted data 500. The transmitter DSP 500 is connected to digital to analog converter (DAC) 504 and then to the channel 506. At the receiver, there is an analog to digital converter (ADC) 508, front end DSP 510 and then the adaptive equalizer 512, including feedback loop with filtering, as described above. It should be understood that the system of FIG. 5 is a very specific example. A system that uses the adaptive equalizer provided herein may differ from that of FIG. 5, and/or may include additional components.

While the detailed embodiments have been shown in the context of a coherent optical receiver, more generally, the approaches provided herein may be useful in any coherent receiver when the conditions are the same: high step size for a changing channel, and high loop delay and blind equalization. The approach is not limited to such conditions however.

Simulations

Various simulations were performed. The optical communication system used in the simulations is running at high speed 16 QAM with constellation shaping and dual polarization. The equalizer used in the simulations is a Constant Modulus Algorithm (CMA) equalizer with 200 parallel threads. The CMA update loop delay is about 50 clocks.

Many synchronization algorithms are running in parallel with the equalizer and depend on the convergence in the equalizer loop. When all synchronization algorithms converge and the two polarizations are aligned with the framer, the equalizer switches to LMS mode.

The linear phase filter used to filter the error gradient is a high pass filter that reduces the low frequency oscillations, having the frequency response shown in FIG. 3, discussed previously.

Figure 6:
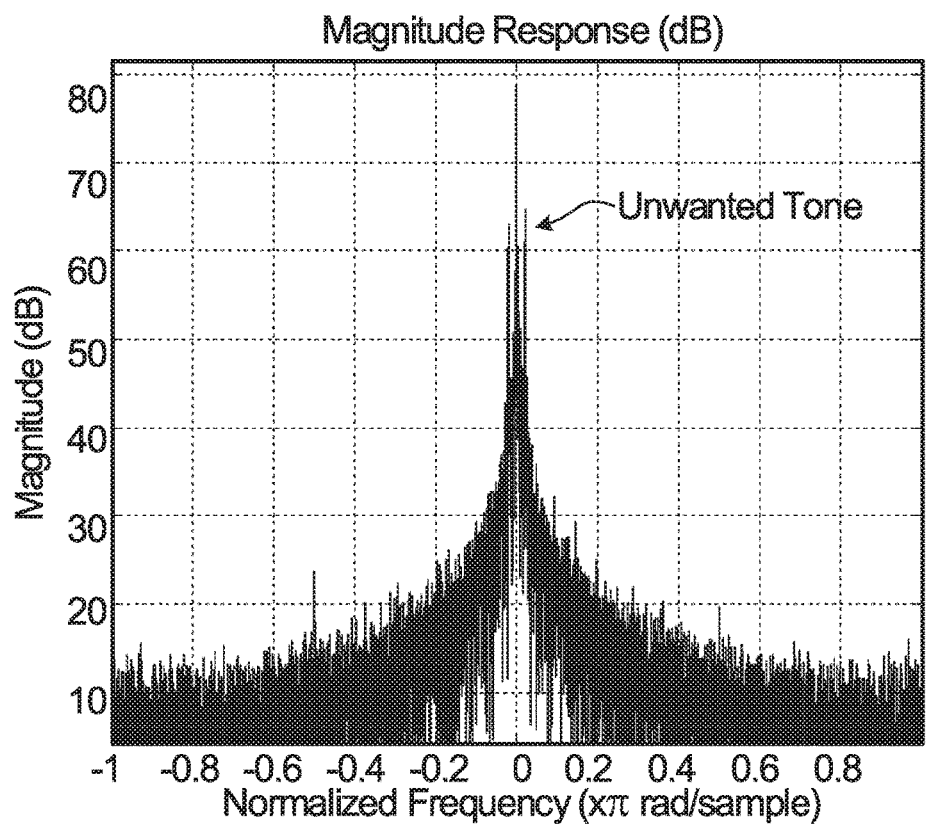
FIG. 6 is a graph showing the effect of the self-generated oscillations in the equalizer on frequency response.

FIG. 6 is a graph showing the effect of the self-generated oscillations in the equalizer on frequency response. The x-axis is the frequency normalized to baud rate/block size. The y-axis is the magnitude of the frequency response of the sum of the taps in the adaptive filter. FIG. 6 shows that the self-generated tone is at low frequency near the DC.

Figure 7:
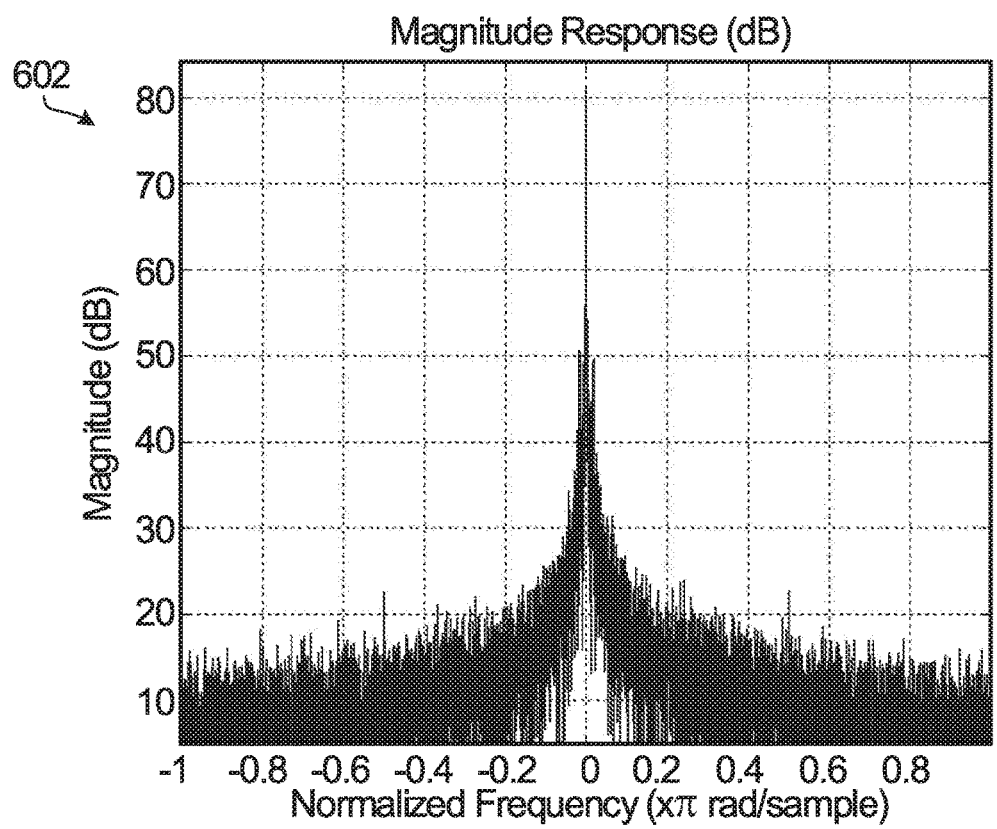
FIG. 7 is a graph showing the effect of filtering the gradient of the error.

FIG. 7 is a graph showing the effect of filtering the gradient of the error. The oscillation magnitude is reduced by more than 12 dB. The other components of the frequency response do not change much at all compared to the self-generated oscillations. The response of the adaptive filter tracks intersymbol interference (ISI) introduced by the channel using the error constraint. Filtering the gradient is improving the convergence speed while reducing the general adaptive filter loop gain, which reduces the oscillations and improves stability.

Figure 8:
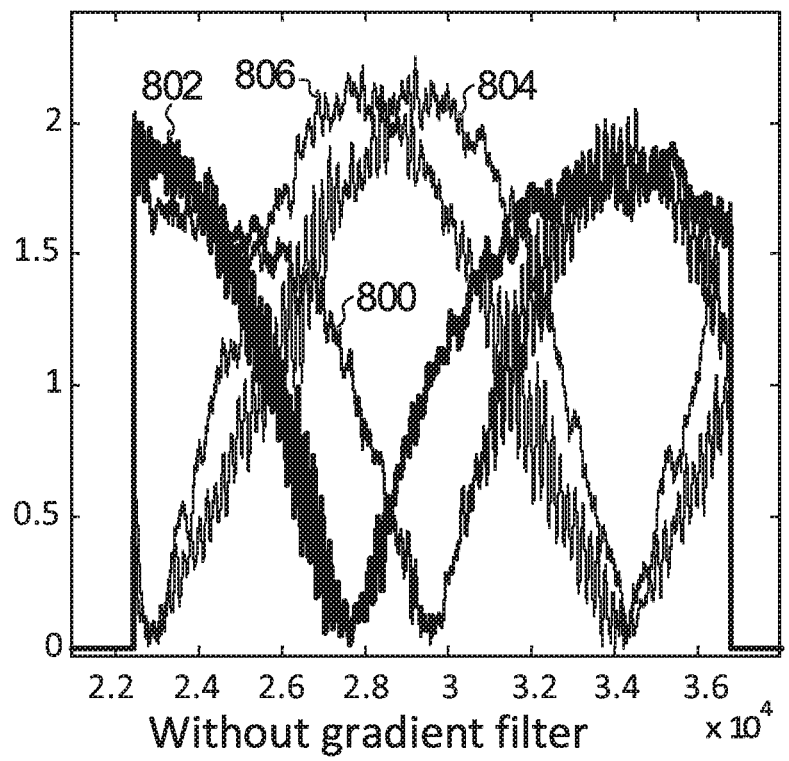
FIG. 8 is a graph showing time variations in the absolute value of the sum of the taps in 4 adaptive filters of a 2×2 MIMO receiver, with no filtering of the error gradient.

FIG. 8 is a graph showing time variations in the absolute value of the sum of the taps in 4 adaptive filters of a 2×2 MIMO receiver. Such a MIMO receiver includes 2 adaptive equalizers with 2 adaptive filters (Wxx, Wyy) and another two adaptive filter that interconnect the two equalizers (Wxy, Wyx) to remove interference. With the rotation of the polarizations in the receiver signal, the absolute value of the sum of the taps will oscillate at frequency equal to the rotation speed of the polarizations. The ripple in the absolute value of the sum of the taps is the self-generated oscillations. In FIG. 8, curves 800, 802, 804, 806 show the time variation in the taps of filters Wxx, Wyy, Wxy, Wyx respectively. FIG. 8 is shows a reduction of ripple in the equalizer coefficients with the use of the gradient filter, which will lead to reduction in the ripple in the output of the equalizer.

FIG. 9 is a graph again showing the time variations in the absolute value of the sum of the taps in 4 adaptive filters of a 2×2 MIMO receiver, but in this case in the presence of the high pass filtering of the gradient of the error.

Figure 9:
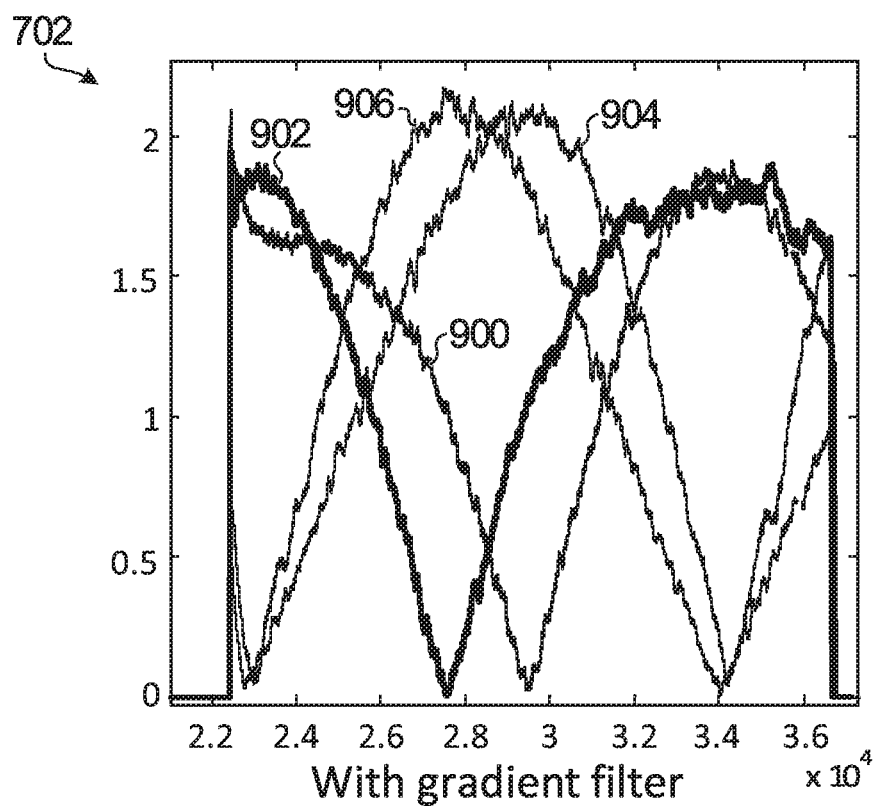
FIG. 9 is a graph showing the time variations in the absolute value of the sum of the taps in 4 adaptive filters of a 2×2 MIMO receiver, with filtering of the error gradient.

In FIG. 9, curves 900, 902, 904, 906 show the time variation in the taps of filters Wxx, Wyy, Wxy, Wyx respectively. FIG. 9 is shows a reduction of ripple in the equalizer coefficients with the use of the gradient filter, which will lead to reduction in the ripple in the output of the equalizer.

FIG. 10 summarizes various optical communication simulation results with different channel conditions as shown in Table 1300. The pass and fail results of the tests are shown in the Table 1302 where there is no filtering of the gradient of the error, and in Table 1304 where there is filtering of the gradient. The results show an improved pass rate when the system includes the gradient filtering. From the simulations, it can be seen that the system is very stable at high OSNR with the gradient filtering. This is because the noise level is low at high OSNR and by removing the effect of oscillations the communication system will have better performance.

Figure 11:
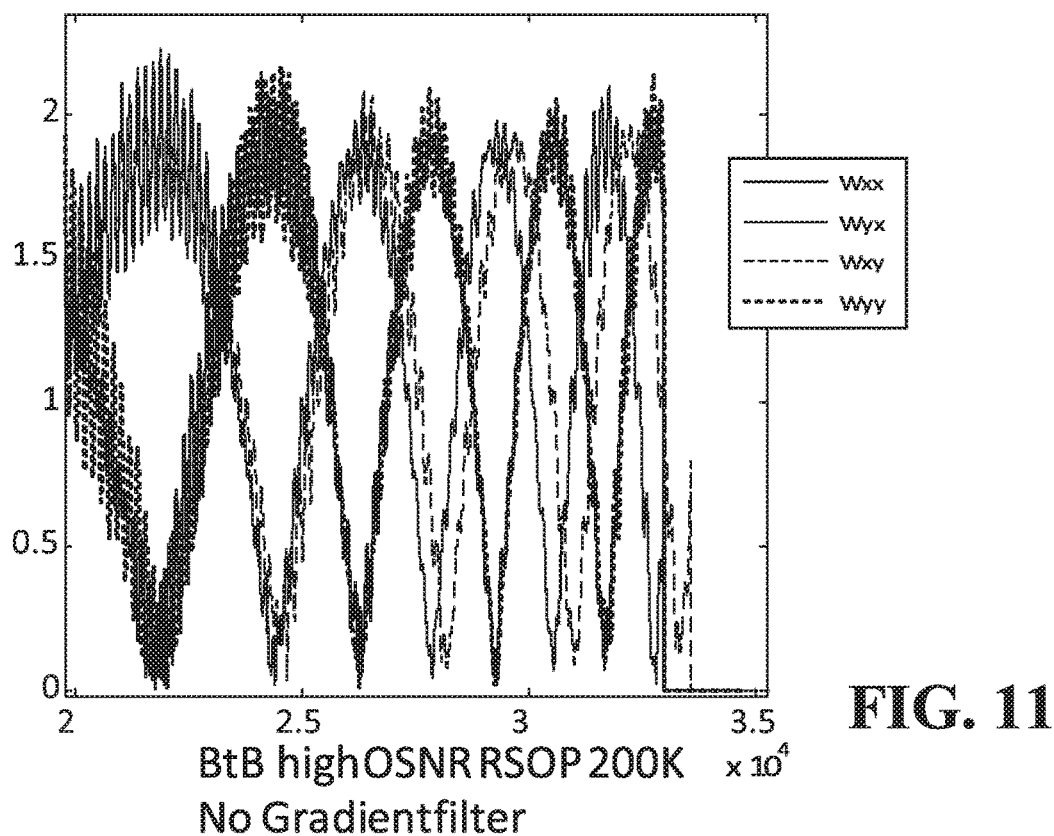
FIG. 11 and FIG. 12 are graphs showing the effect that filtering of the error gradient has upon on the absolute value of the sum of the taps of a MIMO system for a case where an LMS adaptive algorithm is employed in the equalizer for a first set of equalization parameters.
Figure 12:
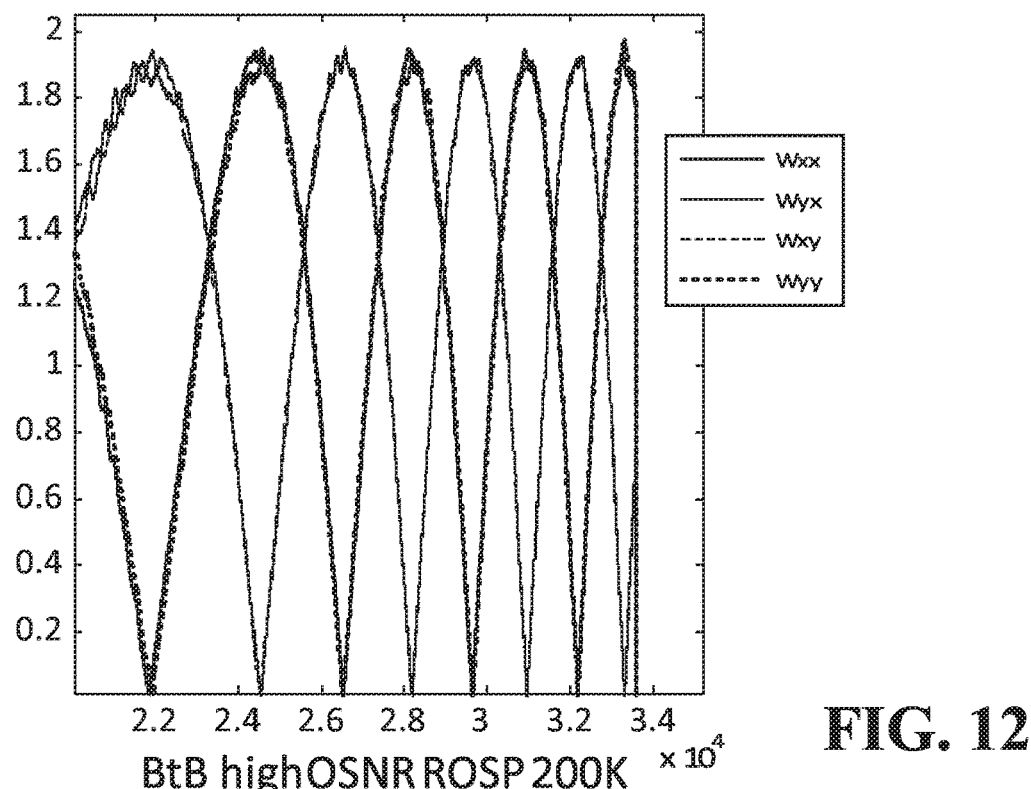

FIG. 11 and FIG. 12 are graphs showing the effect that filtering of the error gradient has upon on the absolute value of the sum of the taps of a MIMO system for a case where an LMS adaptive algorithm is employed in the equalizer. In these Figures, a back to back (BtB) high OSNR optical signal with 200 KHz rotation of state of polarization (RSOP) is used in the simulations. FIG. 11 shows the time variation in the absolute value of the sum of the taps where no gradient filtering is employed, and FIG. 12 shows corresponding results where gradient filtering is employed.

Figure 13:
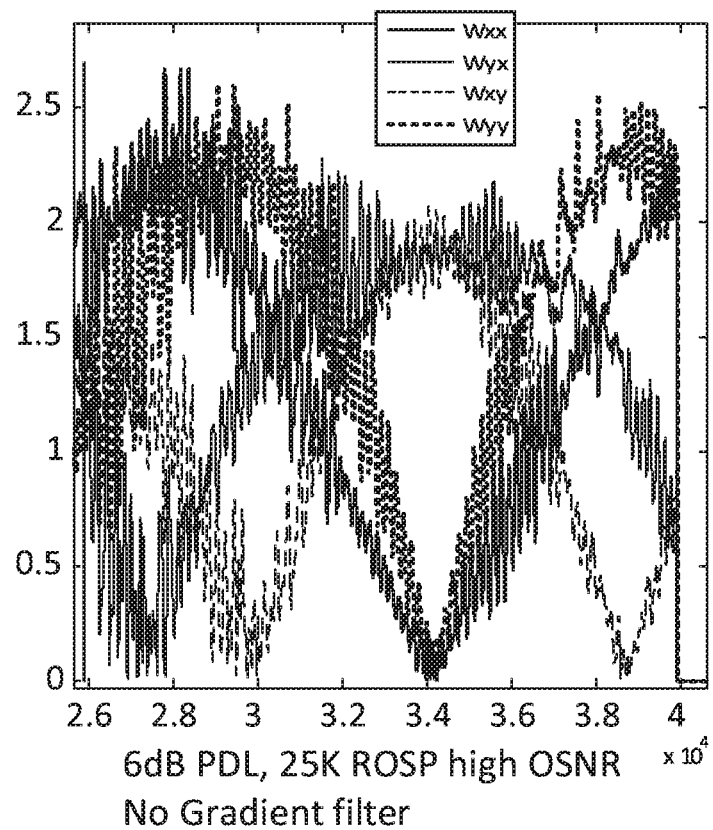
FIG. 13 and FIG. 14 are graphs showing the effect that filtering of the error gradient has upon on the absolute value of the sum of the taps of a MIMO system for a case where an LMS adaptive algorithm is employed in the equalizer for a second set of equalization parameters.
Figure 14:
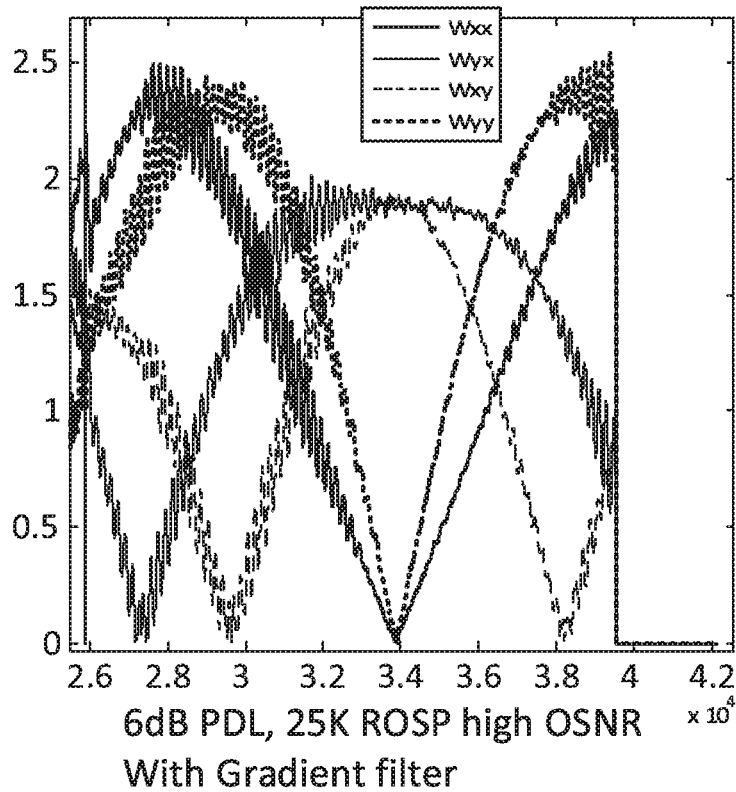

FIG. 13 and FIG. 14 are graphs showing the effect that filtering of the error gradient has upon on the absolute value of the sum of the taps of a MIMO system for a case where an LMS adaptive algorithm is employed in the equalizer. In these Figures, a dual polarized optical signal with 6 dB polarization mode dispersion (PDL) and 25 KHz (ROSP) with high optical SNR (OSNR) is used in the simulations. FIG. 13 shows the time variation in the absolute value of the sum of the taps where no gradient filtering is employed, and FIG. 14 shows corresponding results where gradient filtering is employed.

Figure 15:
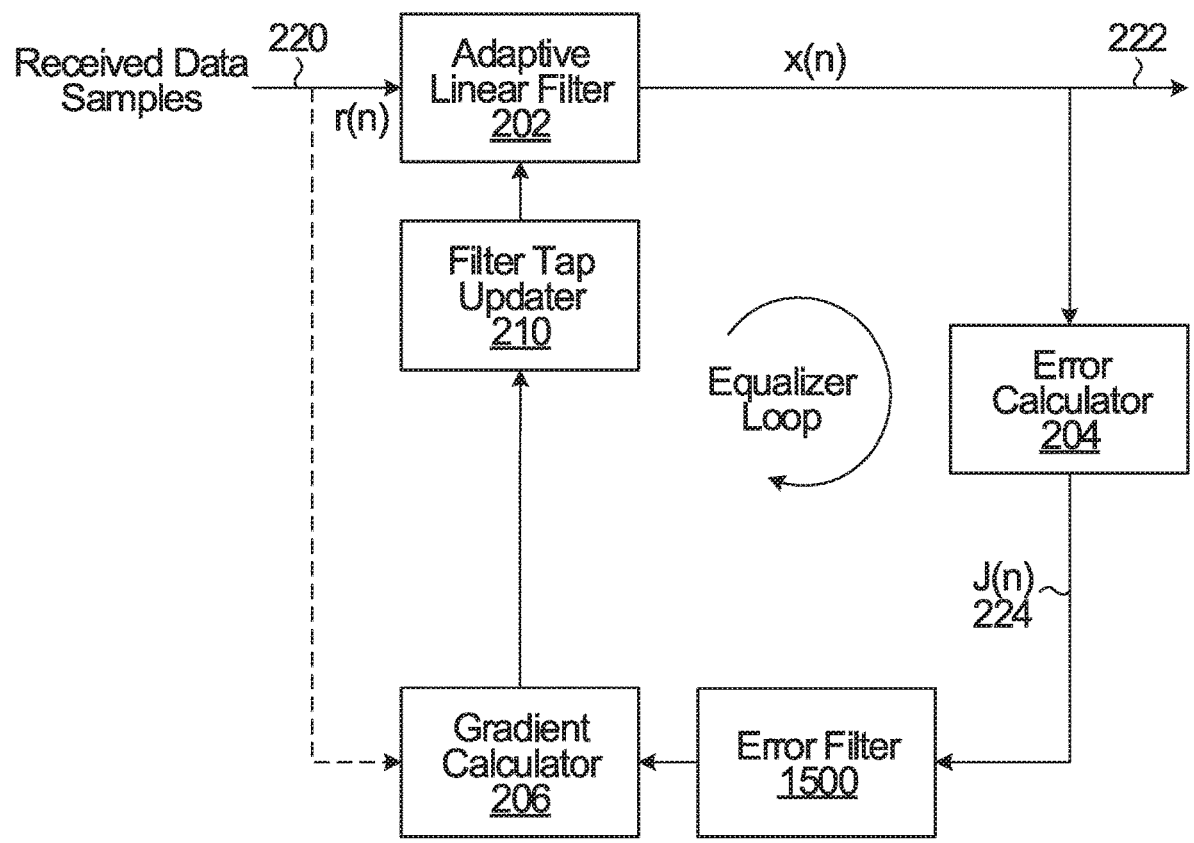
FIG. 15 is a block diagram of an equalizer with loop delay compensation provided by another embodiment of the disclosure.

FIG. 15 is a block diagram of another equalizer with loop delay compensation provided by an embodiment of the disclosure. The equalizer of FIG. 15 is the same as that of FIG. 1 but for the omission of filter 208 of FIG. 1, replaced with error filter 1500 in FIG. 15.

In some embodiments, such as the embodiment of FIG. 3, the he gradient filter used to filter the error gradient is a low pass filter that separates the low frequencies in the gradient to compensate mainly for the rotation of the state of polarization (rSOP) in the channel and the polarization mode dispersion (BMD) variations caused by the rSOP. The output of the gradient filter is multiplied by higher loop gain than the gradient. With the gradient filter gain, the gradient gain can be reduced to increase stability without losing convergence speed because the gradient filter output is compensation for the bigger channel impairments. With gradient loop gain reduction, the low frequency oscillations are reduced.

Further simulations were conducted for the embodiment of FIG. 3. The optical communication system used in these simulations employed at high speed 16 QAM with constellation shaping rate varying from 3.0 to 3.8 with dual polarization. The equalizer loop delay is approximately 20 clock cycles. The channel conditions are set to the normal operation mode during the receiver initialization. The frequency offset and the timing recovery are done on the output of the equalizer. The equalizer is using (Constant Modulus Algorithm) CMA algorithm for initialization with 200 symbols per block.

Figure 16A:
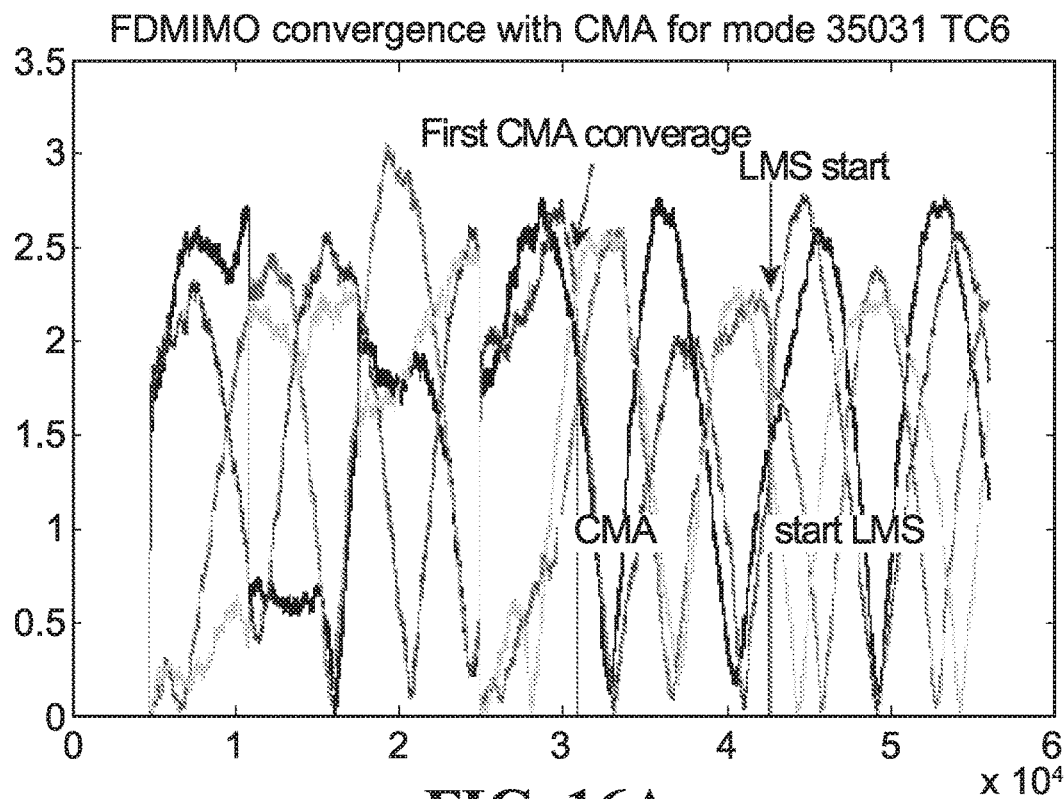
FIGS. 16A and 16B are simulation results for the embodiment of FIG. 3.
Figure 16B:
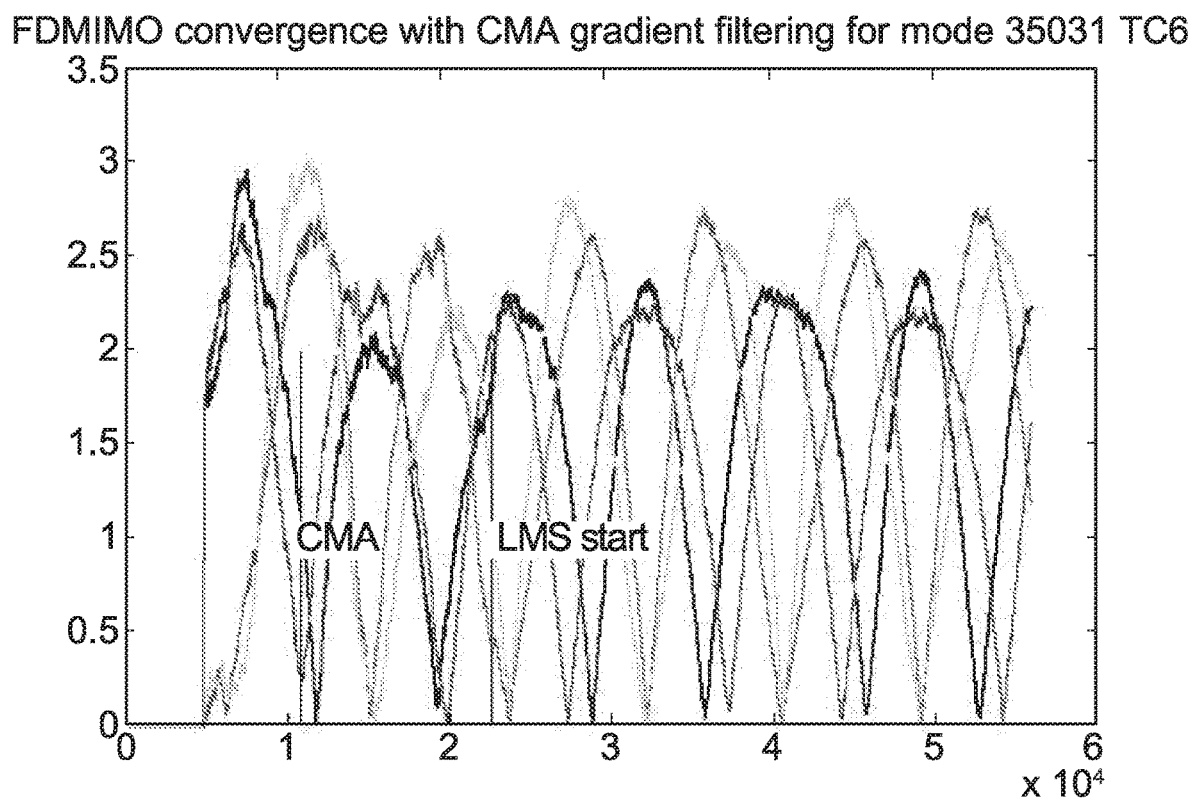

The simulation results with no gradient filtering are shown in FIG. 16A, and the simulation results with gradient filtering are shown in FIG. 16B. The graphs are showing time variations in the absolute value of the sum of the taps in 4 adaptive filters of a 2×2 MIMO receiver. Such a MIMO receiver includes 2 adaptive equalizers with 2 adaptive filters (Wxx, Wyy) and another two adaptive filters that interconnect the two equalizers (Wxy, Wyx) to remove interference. With the rotation of the polarizations in the receiver signal, the absolute value of the sum of the taps will oscillate at a frequency equal to the rotation speed of the polarizations. CMA was has a convergence problem in many test cases when the shaping rate is 3.5 and below as shown in FIG. 16A. When including the gradient filtering, with extra gain at the rSOP frequency after the gradient filter, the CMA could converge for all test cases and with constellation shaping from 3.0 up to 3.8. The test case below is showing the average of the MIMO constellations with normal channel conditions +6 dB PDL, the shaping rate is 3.5. FIG. 16A shows results with normal CMA, and FIG. 16B shows the results with CMA and gradient filtering. It is clear that convergence speed is much better with the use of gradient filtering.

Numerous modifications and variations of the present disclosure are possible in light of the above teachings. It is therefore to be understood that within the scope of the appended claims, the disclosure may be practiced otherwise than as specifically described herein.

The invention claimed is:

1. An adaptive equalizer comprising:
   an adaptive linear filter having a plurality of taps configured to process an input to produce an equalizer output;
   a plurality of components, the adaptive linear filter and the plurality of the components connected in a loop configuration to update taps of the adaptive linear filter, the plurality of components comprising:
   an error calculator configured to calculate an error using an error constraint function based on the equalizer output;
   a gradient calculator configured to calculate a gradient, wherein the gradient is a gradient of the error or a gradient of a filtered error with respect to taps of the adaptive linear filter;
   at least one gradient filter configured to perform a filtering operation on the gradient to produce a filtered gradient, wherein each gradient filter is a bandpass filter having a passband that isolates a respective frequency band of the gradient; and
   an overall gain adjusted filtered gradient calculator configured to apply a gain factor to the gradient to produce a gain adjusted gradient and to apply a respective gain factor to each of the corresponding filtered gradients produced by the at least one gradient filter to produce corresponding gain adjusted filtered gradients, and to sum the gain adjusted gradient and the corresponding gain adjusted filtered gradients to produce the overall gain adjusted filtered gradient;
   a filter tap updater configured to calculate updated taps for the adaptive linear filter phase based on the overall gain adjusted filtered gradient.

2. The adaptive equalizer of claim 1 wherein the passbands and the gains are preselected for a particular channel such that frequency components of the channel that have relatively more time variation are given larger gains.

3. The adaptive equalizer of claim 1 wherein the overall gain adjusted filtered gradient is:

$$\mu \nabla J(n) + \mu_1(h_1(k) \circledast \nabla J(n)) + \mu_2(h_2(k) \circledast \nabla J(n)) + \ldots + \mu_n(h_n(k) \circledast \nabla J(n))$$

where:
   $\nabla J(n)$ is the gradient of the error;
   $\mu$ is the gradient gain factor;

⊙ stands for convolution operation;
$\mu_1, \mu_2, \ldots \mu_n$ are gain factors of filtered gradients; and
$h_1, h_2, \ldots, h_n$ are gradient filter responses.

4. The adaptive equalizer of claim 1 configured for application to a channel where a main source of change in time is rSOP (rotational state of polarization) and the overall gain adjusted filtered gradient is $\mu \nabla J(n)+\mu_1(h_1(n) \odot \nabla J(n))$, where:
   $\nabla J(n)$ is the gradient of the error;
   $\mu$ is the gradient gain factor;
   ⊙ stands for convolution operation;
   $\mu_1$ is the gain factor for a single filtered gradient;
   $h_1$, is the gradient filter response.

5. The adaptive equalizer of claim 1 wherein:
   the equalizer is a blind equalizer.

6. The adaptive equalizer of claim 1 wherein:
   the equalizer is a decision directed equalizer.

7. The adaptive equalizer of claim 1 comprising:
   N adaptive linear filters inclusive of said adaptive linear filter to process a block of N symbols;
   wherein the error calculator calculates N errors including a respective error for each of the N symbols;
   wherein the gradient calculator calculates a respective one of N gradients for each of the N errors;
   the adaptive equalizer comprising N*M gradient filters inclusive of said at least one gradient filter, each group of M filters configured to perform a filtering operation on a respective one of the N gradients to produce a respective filtered gradient;
   the filter tap updater is configured to calculate updated taps for each of the N adaptive linear filters based on a respective one of the N filtered gradients.

8. The adaptive equalizer of claim 1 wherein the error calculator and the gradient calculator are combined.

9. A coherent receiver comprising:
   a receiver for receiving a signal over a channel;
   an analog to digital converter;
   a front end digital signal processor;
   an adaptive equalizer comprising:
      an adaptive linear filter having a plurality of taps configured to process an input to produce an equalizer output;
      a plurality of components, the adaptive linear filter and the plurality of the components connected in a loop configuration to update taps of the adaptive linear filter, the plurality of components comprising:
         an error calculator configured to calculate an error using an error constraint function based on the equalizer output;
         a gradient calculator configured to calculate a gradient, wherein the gradient is a gradient of the error or a gradient of a filtered error with respect to taps of the adaptive linear filter;
         at least one gradient filter configured to perform a filtering operation on the gradient to produce a filtered gradient, wherein each gradient filter is a bandpass filter having a passband that isolates a respective frequency band of the gradient; and
         an overall gain adjusted filtered gradient calculator configured to apply a gain factor to the gradient to produce a gain adjusted gradient and to apply a respective gain factor to each of the corresponding filtered gradients produced by the at least one gradient filter to produce corresponding gain adjusted filtered gradients, and to sum the gain adjusted gradient and the corresponding gain adjusted filtered gradients to produce the overall gain adjusted filtered gradient;
         a filter tap updater configured to calculate updated taps for the adaptive linear filter phase based on the overall gain adjusted filtered gradient.

10. The coherent receiver of claim 9 wherein the coherent receiver is a coherent optical receiver.

11. The coherent receiver of claim 9 wherein the at least one gradient filter produces an output according to:

$$\mu \nabla J(n)+\mu_1(h_1(k) \odot \nabla J(n))+\mu_2(h_2(k) \odot \nabla J(n))+ \ldots +\mu_n(h_n(k) \odot \nabla J(n))$$

where:
   $\nabla J(n)$ is the gradient of the error;
   $\mu$ is the gradient gain factor;
   ⊙ stands for convolution operation;
   $\mu_1, \mu_2, \ldots \mu_n$ are gain factors of filtered gradients; and
   $h_1, h_2, \ldots, h_n$ are gradient filter responses.

12. The coherent receiver of claim 9 configured for application to a channel where a main source of change in time is rSOP (rotational state of polarization) and the overall gain adjusted filtered gradient is $\mu \nabla J(n)+\mu_1(h_1(n) \odot \nabla J(n))$, where:
   $\nabla J(n)$ is the gradient of the error;
   $\mu$ is the gradient gain factor;
   ⊙ stands for convolution operation;
   $\mu_1$ is the gain factor for a single filtered gradient;
   $h_1$, is the gradient filter response.

13. A method of adaptive equalization, the method comprising:
   processing an input with an adaptive linear filter having a plurality of taps to produce an equalizer output;
   calculating at least one error using an error constraint function based on the equalizer output;
   calculating at least one gradient, wherein each of the at least one gradient is a gradient of a respective one of the at least one error or a gradient of a respective filtered one of the at least one error with respect to taps of the adaptive linear filter;
   filtering the at least one gradient to produce at least one filtered gradient; and
   updating taps for the adaptive linear filter phase based on the at least one filtered gradient;
   wherein said filtering the at least one gradient filter is configured to improve adaptive filter convergence at specific frequencies that suffer from more time variations by filtering the specific frequencies and giving them higher loop gain than other frequencies.

14. The method of claim 13 wherein filtering the at least one gradient produces an output according to:

$$\mu \nabla J(n)+\mu_1(h_1(k) \odot \nabla J(n))+\mu_2(h_2(k) \odot \nabla J(n))+ \ldots +\mu_n(h_n(k) \odot \nabla J(n))$$

where
   $\nabla J(n)$ is the gradient of the error;
   $\mu$ is the gradient gain factor;
   ⊙ stands for convolution operation;
   $\mu_1, \mu_2, \ldots \mu_n$ are gain factors of filtered gradients; and
   $h_1, h_2, \ldots, h_n$ are gradient filter responses.

15. The method of claim 13 configured for application to a channel where a main source of change in time is rSOP (rotational state of polarization) and the overall gain adjusted filtered gradient is $\mu \nabla J(n)+\mu_1(h_1(n) \odot \nabla J(n))$, where:
   $\nabla J(n)$ is the gradient of the error;
   $\mu$ is the gradient gain factor;

⊙ stands for convolution operation;
μ₁ is the gain factor for a single filtered gradient;
h₁, is the gradient filter response.

16. The method of claim 13 wherein:
said adaptive equalization is blind equalization.

17. The method of claim 13 wherein:
said adaptive equalization is decision directed equalization.

18. The method of claim 13 performed blockwise to process a block of N symbols with N adaptive linear filters inclusive of said adaptive linear filter.

19. A method of performing coherent reception comprising:
receiving a signal over a channel;
performing analog to digital conversion and front end digital signal processing;
performing adaptive equalization using the method of claim 13.

20. The method of claim 19 wherein receiving a signal over a channel comprises receiving an optical signal over an optical channel.

* * * * *